United States Patent
Schenk et al.

(10) Patent No.: US 8,751,875 B2
(45) Date of Patent: Jun. 10, 2014

(54) METHOD FOR CHECKING SUITABILITY OF A DATA PROCESSING DEVICE FOR PERFORMING FAILSAFE AUTOMATION PROCESSES

(75) Inventors: Andreas Schenk, Erlangen (DE); Markus Walter, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 454 days.

(21) Appl. No.: 12/760,660

(22) Filed: Apr. 15, 2010

(65) Prior Publication Data

US 2010/0268356 A1 Oct. 21, 2010

(30) Foreign Application Priority Data

Apr. 17, 2009 (EP) .................................. 09005484

(51) Int. Cl.
*G06F 11/00* (2006.01)
(52) U.S. Cl.
USPC ............................................ 714/48; 709/248
(58) Field of Classification Search
USPC ............................................................ 714/48
See application file for complete search history.

(56) References Cited

U.S. PATENT DOCUMENTS

| | | | | |
|---|---|---|---|---|
| 4,707,142 A * | 11/1987 | Baker et al. | | 368/46 |
| 5,040,158 A * | 8/1991 | Lee et al. | | 368/10 |
| 5,301,171 A * | 4/1994 | Blow et al. | | 368/46 |
| 6,708,137 B2 * | 3/2004 | Carley | | 702/179 |
| 7,583,692 B2 * | 9/2009 | Fuhrmann et al. | | 370/458 |
| 8,161,174 B1 * | 4/2012 | Sankaranaraynan et al. | | 709/229 |
| 8,253,585 B2 * | 8/2012 | Hidalgo Rodrigo | | 340/870.02 |
| 2003/0018450 A1 * | 1/2003 | Carley | | 702/179 |
| 2003/0067873 A1 * | 4/2003 | Fuhrmann et al. | | 370/230 |
| 2006/0036879 A1 * | 2/2006 | Wahler et al. | | 713/300 |
| 2007/0033294 A1 * | 2/2007 | Ungermann et al. | | 709/248 |
| 2007/0245054 A1 * | 10/2007 | Wang et al. | | 710/261 |
| 2008/0098146 A1 * | 4/2008 | Lee | | 710/269 |
| 2008/0229151 A1 * | 9/2008 | Ito | | 714/37 |
| 2008/0267328 A1 * | 10/2008 | Ianni et al. | | 375/354 |
| 2010/0205473 A1 * | 8/2010 | Schirmer et al. | | 713/600 |
| 2010/0308868 A1 * | 12/2010 | Zinke et al. | | 327/20 |

FOREIGN PATENT DOCUMENTS

| | | |
|---|---|---|
| EP | 1 043 640 | 10/2000 |
| WO | WO 03/052563 | 6/2003 |
| WO | WO 2009/031060 | 3/2009 |

* cited by examiner

*Primary Examiner* — Kamini Patel
(74) *Attorney, Agent, or Firm* — Cozen O'Connor

(57) ABSTRACT

A method for checking a data processing device to determine its suitability for performing failsafe automation processes, wherein the data processing device includes a first and a second time base. The method comprises determining a first time value of the first time base after expiration of a time period of length T, determining a second time value of the second time base after the expiration of the time period of length T, determining a deviation between the first and the second time value, and initiating a troubleshooting measure if the deviation undershoots, i.e., undershoots or reaches, a predefined or pre-definable limit value.

15 Claims, 3 Drawing Sheets

METHOD FOR CHECKING SUITABILITY OF A DATA PROCESSING DEVICE FOR PERFORMING FAILSAFE AUTOMATION PROCESSES

BACKGROUND OF THE INVENTION

The present invention relates to data processing and, more particularly, to a method for checking a data processing device to determine its suitability for performing failsafe automation processes.

Methods are known for processing data. For example, the publication document EP 1 043 640 A2 discloses a method with which it can be established by checking identification codes of the central processing unit of an automation system whether the central processing unit is suitable for performing failsafe applications.

It is a disadvantage of such a conventional method that the identification codes, which are typically specified as early as possibly during the production of an automation system, are fixed from the outset and also cannot be adapted to subsequent further developments. Moreover, it is also not possible therewith to perform a subsequent check to determine a system's suitability for safety-related applications if this was not previously provided and verified at the time of manufacture of the hardware. In particular, when standardized data processing devices, such as a personal computer or workstation, are used in the automation environment, the identification codes are usually not provided.

SUMMARY OF THE INVENTION

It is therefore an object of the present invention to provide a method by which a data processing device can be more easily or flexibly checked to determine its potential for performing failsafe automation processes.

This and other objects and advantages are achieved in accordance with the invention by a method for checking a data processing device, i.e., an automation device, a computer, a personal computer or a workstation, to determine its suitability for performing failsafe automation processes.

Here, the data processing device includes a first time base and a second time base. In accordance with the invention, the method comprises the steps of determining a first time value of the first time base after the expiration of a time period of length T, determining a second time value of the second time base after the expiration of the time period of length T, determining a deviation between the first and second time values, and initiating a troubleshooting measure if the deviation undershoots, and in particular undershoots or reaches, a predefined or predefinable limit value.

Data processing devices within the context of the described invention can be all equipment, devices or device combinations that are suitable or configured for controlling automation processes. These devices include, e.g., devices specifically developed for that purpose, such as "programmable logic controllers" (PLCs) or their components or other electronic control devices or controllers. However, a data processing device can also be, for example, a computer, such as a personal computer (PC) or a workstation. Such computers can likewise be configured or embodied for performing automation processes, e.g., by appropriate programming, operating systems or operating system versions and/or programming.

Within the scope of the present description, failsafe automation processes are also understood to encompass safety-related automation processes, such as those described in the International Electrotechnical Commission (IEC) 61508 standard.

Within the scope of the described invention, failsafe automation processes are understood to refer to failsafe or safety-related automation processes which conform, for example, to the IEC 61508 standard and/or to a comparable standard and/or to a comparable regulation.

In order to be suitable for performing failsafe automation processes of the foregoing kind, a data processing device must fulfill certain requirements, according to the functional safety standard or characteristics chosen. Such characteristics can be, e.g., the presence of mutually independent, redundant time bases or similar characteristics.

Within the scope of the described invention, "checking suitability for performing failsafe automation processes" is understood to comprise checking one criterion or a plurality of criteria out of the criteria required for the chosen safety level. It should be noted that the foregoing does not imply the complete verification of all the necessary criteria.

For example, two mutually independent time bases are required in the automation system to perform failsafe automation processes of the aforesaid type. By regularly comparing the time bases, the system is then able to detect errors or failures occurring within a time base and then bring the system under control into a safe state or hold it in the safe state.

In this case, a time base may comprise, for example, a counter, clock pulse or clock, and can be implemented in hardware and/or software. Two time bases are independent, for example, when each of the time bases is assigned a dedicated hardware clock generator, such as a hardware oscillating element.

A time value can be any value which is based on the timing of the respective time base and is a measure for an elapsed time period. Time values can be determined, such as within the framework of conventional time units (e.g., hours, minutes, seconds, milliseconds or microseconds). Alternatively, arbitrary time units can also be chosen.

Hardware oscillating elements of this type comprise, for example, electromechanical and/or piezoelectric oscillators and/or electronic oscillators (e.g., RC elements). Here, a piezoelectric oscillator can comprise, for example, an oscillating quartz crystal, as used routinely as a hardware timing source in contemporary electronic systems.

Different hardware oscillating elements usually have a different drift over time, for example, as a function of the temperature, heating, aging, air humidity or other environmental conditions.

In accordance with the invention, by comparing the time bases over a selected time period, it possible to establish whether two of the above-described independent time bases are provided in the data processing device. An important indication thereof is, e.g., if the determined deviation between the two time bases after the expiration of the time period T is above a limit value that is, for example, typical of or a minimum for production-related drift differences of correspondingly assigned hardware oscillating elements.

Here, the predefined or predefinable limit value can be selected such that, with a typical or minimum drift difference of underlying hardware oscillating elements (such as oscillating quartz crystals) in the system, the deviation between the time values is above the limit value. The limit value can correspond, for example, to a maximum jitter (e.g. due to timing+read deviation+other delays) of the time bases.

When oscillating quartz crystals are used, the difference can be less than $10^{-2}$ or $10^{-3}$ percent, for example, typically also within the range of $10^{-4}$ percent of the measured time period or several multiples thereof. These cited limit values are based on the fact that the deviation is calculated as the difference between the first and second time value.

A deviation can, however, also be calculated, for example, as a quotient, or as a difference or quotient of squares of the time values or similar. In these cases the limit value can then be adjusted accordingly.

The length T of the time period, over which the time value of a time base is determined, can be specified by one of the time bases, for example. Furthermore, a third time base can also be called upon for the purpose of determining the time period T.

The time value can be determined in parallel such that after the expiration of the time period of length T the two time bases are stopped and the corresponding time value is read out. Furthermore the time values can also be determined independently of each other and then the deviation in the time values determined subsequently.

Here, one minute or more, preferably 5 minutes or more, more preferably 15 minutes or more, even more preferably 30 minutes or more, or even 60 minutes or more, can be used as the time period. In particular when oscillating quartz crystals are used as the hardware oscillating elements, typical, e.g., production-related, drift differences can be relatively reliably demonstrated within these times. The time period can be permanently predefined, for example, and/or also be settable by a user input.

The data processing device can comprise, for example, a standard personal computer (PC) or standard workstation. Consequently, these types of standard components, which are readily available on the market and are relatively cheap, can be advantageously used for controlling automation processes. The method in accordance with the present invention makes it possible to check such standard components to determine their suitability for performing failsafe automation processes. In the positive case, where appropriate following further checks, even such standard systems can then be used for the operation of failsafe automation processes.

The output of a message can be provided, for example, as a troubleshooting measure that is initiated if the deviation falls below a predefined or predefinable limit value, where the message relates to the impossibility of confirming the independence of the first and second time base. In this way, it is brought to a user's attention, for example, that it was not possible to confirm the independence of the first and second time base with sufficient certainty by the check that was performed. A user can then take this as a reason to check the hardware accordingly or to perform further tests for example.

Furthermore, a troubleshooting measure can also include an automated or automatically executing operation. Such an operation may be, for example, preventing or stopping a failsafe automation program if, for example, the independence of the time bases is to be checked before or during its execution. The shutdown of a component or device can also be a troubleshooting measure or part of a troubleshooting measure.

A troubleshooting measure in accordance with the present invention can also be initiated if the deviation in the time values exceeds a predefined or predefinable second limit value. Here, the second limit value is above the limit value. Such a measure may be provided to ensure a reliable execution of failsafe applications. Moreover, the second limit value can be chosen such that, in the event of deviations lying above the second limit value, reliable failsafe operation is no longer guaranteed because, for example, the system regularly concludes during the time measurement that one timer is defective. Such a conclusion can occur because the regular deviation between the two timers, for example, already lies within the scope of that which is considered to be a fault within the system. Second limit values of this kind can lie, for example, in the range from 0.01 percent to 1 percent, in certain conditions also to 10 or 50 percent of the considered time period, in particular in the range of 0.5 percent. The checking of a data processing device to determine its potential for performing failsafe automation processes is further improved by the presently contemplated embodiment.

In another embodiment, a success measure is initiated if the deviation between the first and the second time value exceeds the limit value, i.e., exceeds the limit value and undershoots the second limit value. Here, it can be assumed with relatively high certainty that the first and second time bases are independent of each other, for example, being driven or, as the case may be, triggered by two independent hardware oscillating elements, such as oscillating quartz crystals.

Furthermore, in the case in which the deviation in the time values undershoots the second limit value, it can also be ensured, for example, that the time bases exhibit no differences that are so great that a failsafe execution of an automation program would be compromised.

In another embodiment, a message providing a confirmation of the independence of the time bases is provided as a success measure, for example, or the success measure can include such a confirmation. Furthermore, the success measure may also start or continue an automated process or, as the case may be, include such a measure.

In a further advantageous embodiment the data processing device comprises a personal computer or workstation that includes a standard time base having a system quartz crystal and an RTC time base for operating a real-time clock of the data processing device, where the first time base is assigned the system quartz crystal and the second time base is assigned the system quartz crystal or an RTC quartz crystal. Here, the RTC quartz crystal can be provided as standard for driving the RTC time base.

In accordance with the currently contemplated embodiment, the standard time base can be configured, for example, for providing a processor clock pulse and can drive or trigger, for example, a "timestamp counter", a local APIC timer, a PC timer or a PM timer. The RTC time base can be provided for operating a real-time clock which continues running, for example, by battery power, even after the data processing device has been switched off. Furthermore, the RTC time base or the RTC quartz crystal can also be provided for other operations within the data processing device. In particular, it is possible to use their signals for driving a so-called "F-timer" configured redundantly in addition to a standard timer within the framework of a safety-related automation program.

The aforementioned object is also achieved by a data processing device, i.e., a personal computer or workstation, for performing automation processes comprising at least one processor, a hardware oscillating element for providing a clock pulse, e.g., for the at least one processor, a first time base which can be driven or is driven using the hardware oscillating element, a second time base which can be driven or is driven using a further hardware oscillating element, i.e., for operating a real-time clock of the data processing device, or using the hardware oscillating element, and a control device which is embodied and configured for performing a method according to the present invention.

Here, the hardware oscillating element can be configured, for example, as explained subsequently in the present application. For example, the hardware oscillating element may comprise a system quartz crystal in a computer. A further hardware oscillating element can be configured in accordance with the initially described hardware oscillating element but, for example, as an RTC quartz crystal of a computer.

The check to determine whether the data processing device is suitable for performing failsafe automation processes can also be improved or simplified by a data processing device embodied and configured in the aforesaid manner, for the reasons already cited hereintofore.

The above-cited object is likewise achieved by a program element for checking a data processing device to determine its suitability for performing failsafe automation processes, wherein the program element, when executed by a processor, is configured for performing the method in accordance with the contemplated embodiments.

The above-cited object is also achieved by a non-transitory computer-readable storage medium in which a program for checking a data processing device to determine its suitability for performing failsafe automation processes is stored, where the program, when executed by a processor, is configured for performing a method in accordance with the contemplated embodiments.

Other objects and features of the present invention will become apparent from the following detailed description considered in conjunction with the accompanying drawings. It is to be understood, however, that the drawings are designed solely for purposed of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described therein.

BRIEF DESCRIPTION OF THE DRAWINGS

The present invention is explained in more detail below by way of example with reference to the accompanying figures, in which.

DETAILED DESCRIPTION OF THE PRESENTLY PREFERRED EMBODIMENTS

Figure 1:
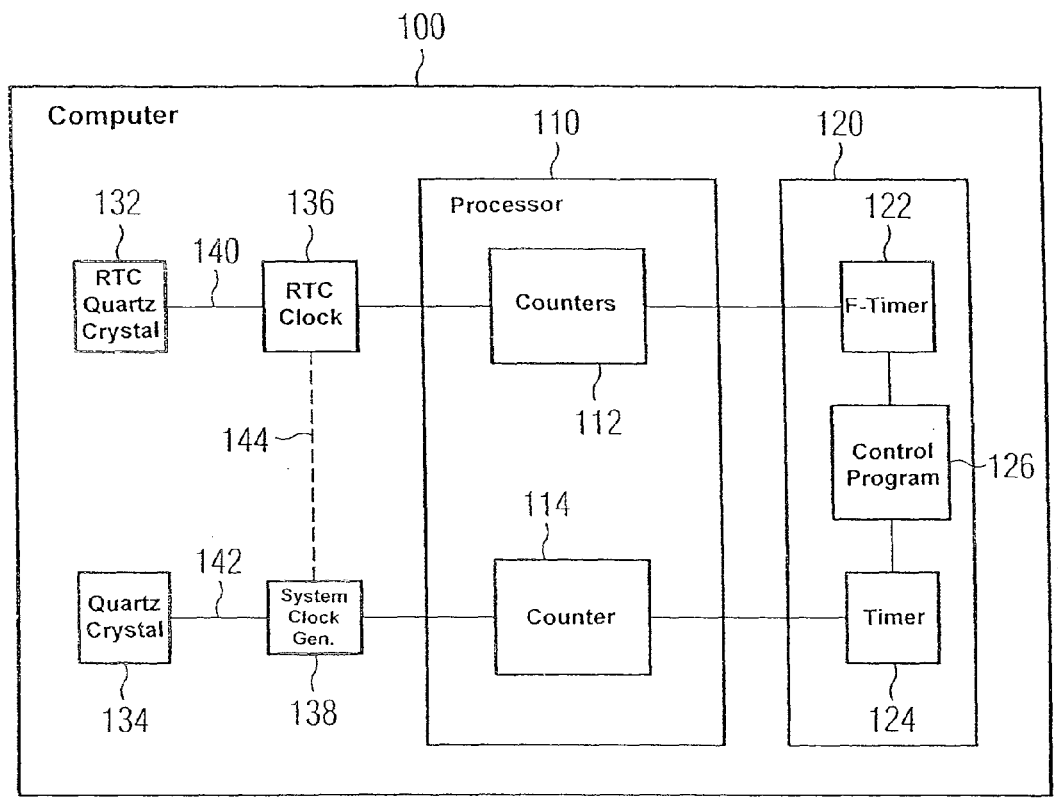
FIG. 1 shows a schematic of a personal computer which is configured for performing an automation application in accordance with the invention.

FIG. 1 shows a schematic diagram of a personal computer (PC) 100 having a processor 110 and an automation application 120. In addition, the PC 100 has a system quartz crystal 134 which triggers a system clock generator 138 by a connecting line 142. The PC 100 also includes an RTC quartz crystal 132 which triggers a real-time clock (RTC) 136 by a connecting line 140. In this arrangement the real-time clock 136 is connected inter alia to one or more counters 112 in the processor 110, where the counters 112 further serve as a basis for an F-timer 122 in the automation application. The system clock generator 138 drives, for example, the processor clock and further counters 114, at least one thereof being used for a standard timer 124 of the automation application 120.

A control program 126 of the automation application 120 then uses the values of the standard timer 124 and the F-timer 122 for a failsafe determination of the time for all time-dependent operations. If there is a deviation in the two values, the system then detects an error in the time measurement and switches the automation system under control into a failsafe state.

A program for performing a method in accordance with the present invention can also be used, for example, as the control program 126. In this case, the values of the F-timer 122 and the standard timer 124 are then determined over the course of a predefined time period and compared. If a first limit value of, for example, $1.361 \cdot 10^{-4}$ percent of the time period is exceeded, the control program 126 then provides a message to a user indicating that, with a high degree of probability, the PC 100 has independent time bases and/or is suitable for performing safety-related applications.

Figure 2:
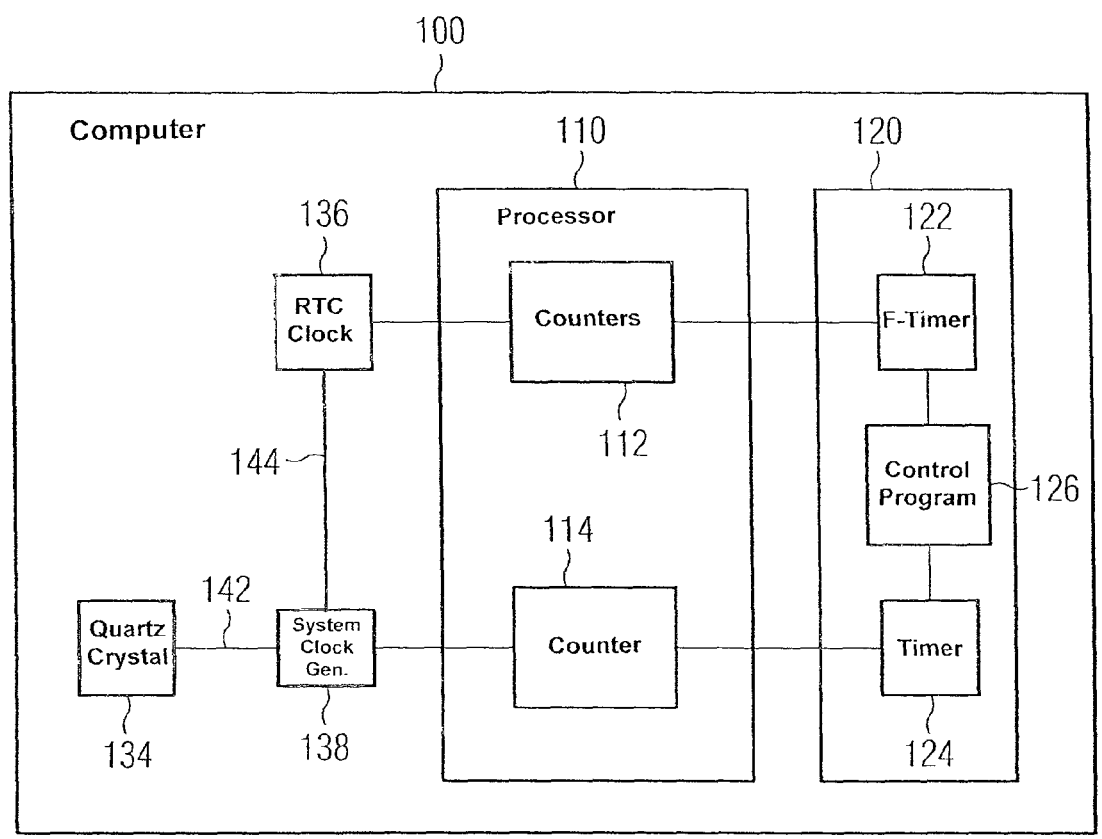
FIG. 2 is shows a schematic of a personal computer which is configured for performing an automation application in accordance with an alternative embodiment of the invention.

FIG. 2 is another embodiment of the PC 100. In this embodiment, the PC 100 includes no RTC quartz crystal 132 and thus no connection 140 exists (see FIG. 1). Consequently, the system clock generator drives the real-time clock 136 over the connection 144. Here, both the F-timer 122 and the standard timer 124 of the automation application 120 revert to the same time base. It is then natural that there exists no drift in accordance with the contemplated embodiments of the invention, between the two timers 122, 124, and the deviation of the timers 122, 124 over the measured time period will be below the provided limit value. Here, the control program 126 then provides a user with the message indicating, for example, that no proof concerning the executability of a failsafe application program could be furnished.

The contemplated embodiments of the invention describe methods for checking a data processing device for two independent time bases, as are required, for example, for executing failsafe (or safety-related) automation applications in accordance with the IEC 61508 standard. The contemplated embodiments of the invention exploit the fact that for production-related reasons two independent time bases typically exhibit deviations over the course of time, such as a drift, on the basis of which the independence of the time bases can be proven or, as the case may be, checked.

Figure 3:
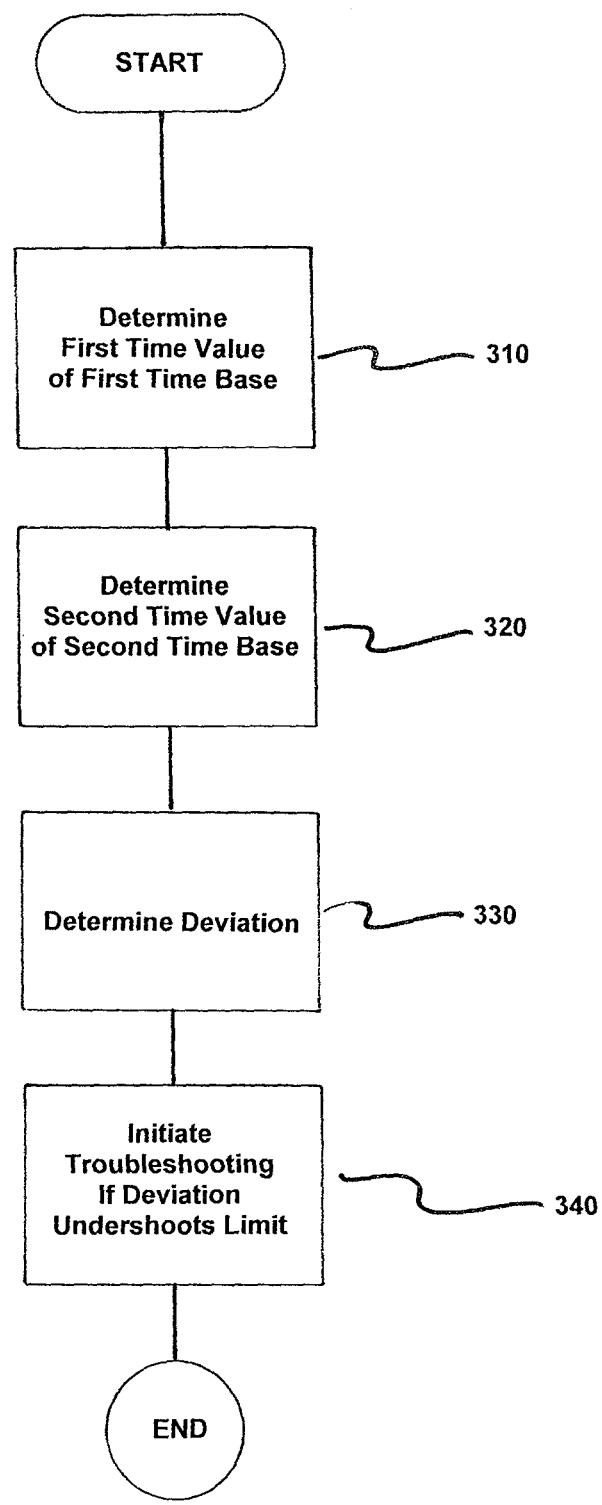
FIG. 3 is a flow chart of the method in accordance with an embodiment of the invention.

FIG. 3 is a flow chart illustrating a method for checking a data processing device to determine its suitability for performing failsafe automation processes in accordance with an embodiment of the invention, where the data processing device including a first time base and a second time base. The method comprises determining a first time value of the first time base after expiration of a time period of length T, as indicated in step 310. A second time value of the second time base is also determined after the expiration of the time period of length T, as indicated in step 320. Steps 310 and 320 may be performed sequentially one after the other, or simultaneously. The deviation between the first and the second time value is then determined, as indicated in step 330. Next, a troubleshooting measure is initiated if the deviation undershoots a predefined or pre-definable first limit value, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for checking a data processing device to determine its suitability for performing failsafe automation processes, the data processing device including a first time base and a second time base, the method comprising the steps of:
   determining a first time value of the first time base of the data processing device to determine its suitability for performing failsafe automation processes after expiration of a time period of length T;
   determining a second time value of the second time base of the data processing device after the expiration of the time period of length T;
   comparing the first and second time bases over a selected time period to determine a deviation between the first and second time values of the data processing device to check independence of the first and second time bases; and
   initiating a troubleshooting measure of the data processing device if the deviation undershoots or reaches a predefined or pre-definable first limit value.

2. The method as claimed in claim 1, wherein the troubleshooting measure is initiated if the deviation undershoots or reaches the pre-definable first limit value.

3. The method as claimed in claim 1, wherein the troubleshooting measure is initiated if the deviation exceeds a predefined or pre-definable second limit value.

4. The method as claimed in claim 1, wherein said step of initiating the troubleshooting measure includes outputting a message relating to an impossibility of confirming an independence of the first and second time bases.

5. The method as claimed in claim 3, wherein said step of initiating the troubleshooting measure includes outputting a message relating to an impossibility of confirming an independence of the first and second time bases.

6. The method as claimed in claim 1, wherein a success measure is initiated if the deviation exceeds the first limit value.

7. The method as claimed in claim 6, wherein the success measure is initiated if the deviation exceeds the first limit value and undershoots a second limit value.

8. The method as claimed in claim 1, wherein the first time base and the second time base are each assigned a hardware oscillating element.

9. The method as claimed in claim 7, wherein the hardware oscillating element comprises at least one of an electromechanical oscillator, a piezoelectric oscillator and an oscillating quartz crystal.

10. The method as claimed in claim 1, wherein the data processing device comprises one of a personal computer or workstation including a standard time base having a system quartz crystal and a real-time clock (RTC) time base for driving a real-time clock of the data processing device; and
   wherein the first time base can be driven or is driven using the system quartz crystal and the second time base can be driven or is driven using an RTC quartz crystal for the real-time clock or using the system quartz crystal.

11. The method as claimed in claim 1, wherein the data processing device comprises one of an automation device or a computer.

12. A data processing device for performing automation processes, comprising:
   at least one processor;
   a hardware oscillating element;
   a first time base connected to the at least one processor and configured to supply a clock pulse to the at least one processor, the first time base being drivable or driven using the hardware oscillating element;
   a second time base connected to the at least one processor and configured to operate a real-time clock of the data processing device, the time base being drivable or driven using one of a further hardware oscillating element or the hardware oscillating element; and
   a control device configured to:
      determine a first time value of the first time base after expiration of a time period of length T to provide an indication of the suitability of the data processing device to perform failsafe automation processes;
      determine a second time value of the second time base after the expiration of the time period of length T;
      compare the first and second time bases over a selected time period to determine a deviation between the first and second time values to check independence of the first and second time bases; and
      initiate a troubleshooting measure if the deviation undershoots or reaches a predefined or predefinable first limit value.

13. A process in which a computer executes instructions set forth in a computer program executing on a processor which, when used on the computer causes the processor to check a data processing device to determine suitability of the data processing device for performing failsafe automation processes, the data processing device including a first time base and a second time base, the computer program comprising:
   program code for determining a first time value of the first time base of the data processing device to determine its suitability for performing failsafe automation processes after expiration of a time period of length T;
   program code for determining a second time value of the second time base of the data processing device after the expiration of the time period of length T;
   program code for comparing the first and second time bases over a selected time period to determine a deviation between the first and second time values of the data processing device to check independence of the first and second time bases; and
   program code for initiating a troubleshooting measure of the data processing device if the deviation undershoots or reaches a predefined or pre-definable first limit value.

14. A non-transitory computer-readable storage medium encoded with a computer program executed by a computer that checks a data processing device to determine its suitability for performing failsafe automation processes is stored, the data processing device including a first and a second time base, the computer program comprising:
   program code for determining a first time value of the first time base of the data processing device to determine its suitability for performing failsafe automation processes after expiration of a time period of length T;
   program code for determining a second time value of the second time base of the data processing device after the expiration of the time period of length T;
   program code for comparing the first and second time bases over a selected time period to determine a deviation between the first and second time values of the data processing device to check independence of the first and second time bases; and
   program code for initiating a troubleshooting measure of the data processing device if the deviation undershoots or reaches a predefined or pre-definable first limit value.

15. The data processing device as claimed in claim 11, wherein the data processing device comprises one of an automation device or a computer.

* * * * *